United States Patent
Martynov et al.

(10) Patent No.: US 10,880,087 B2
(45) Date of Patent: Dec. 29, 2020

(54) SYSTEM AND METHOD FOR SERVICE-TO-SERVICE AUTHENTICATION

(71) Applicant: JPMorgan Chase Bank, N.A., New York, NY (US)

(72) Inventors: Dennis Martynov, San Jose, CA (US); Atit Shah, Mountain View, CA (US)

(73) Assignee: JPMorgan Chase Bank, N.A., New York, NY (US)

( * ) Notice: Subject to any disclaimer, the term of this patent is extended or adjusted under 35 U.S.C. 154(b) by 206 days.

(21) Appl. No.: 16/105,521

(22) Filed: Aug. 20, 2018

(65) Prior Publication Data

US 2020/0059360 A1 Feb. 20, 2020

(51) Int. Cl.
*H04L 9/32* (2006.01)
*G06F 9/54* (2006.01)
(Continued)

(52) U.S. Cl.
CPC ............ *H04L 9/3213* (2013.01); *G06F 9/547* (2013.01); *G06Q 20/401* (2013.01); *H04L 63/08* (2013.01);
(Continued)

(58) Field of Classification Search
CPC ....... H04L 9/3213; H04L 63/08; H04L 63/10; H04L 63/123; H04L 63/0807;
(Continued)

(56) References Cited

U.S. PATENT DOCUMENTS 7,900,247 B2* 3/2011 Chong .................... H04L 67/02
726/10
8,583,915 B1* 11/2013 Huang .................. H04L 9/3236
713/155
(Continued)

OTHER PUBLICATIONS

Palm, "Service isolation in large microservice networks." Jun. 11, 2018, Retrieved on Oct. 12, 2019 from http://www.nada.kth.se/-ann//exjobb/jonas_palm.pdf (entire document).
(Continued)

*Primary Examiner* — Abu S Sholeman
(74) *Attorney, Agent, or Firm* — Hunton Andrews Kurth LLP

(57) ABSTRACT

The invention relates to a computer-implemented system and method for service-to-service authentication. The method may comprise deploying the SSA service, deploying a micro service, and providing an SSA client that serves as an interface between the micro service and the SSA service. The micro service can send a request to the SSA service for an authentication token. The SSA service then generates the authentication token for the micro service, which is signed by the SSA service using an SSA service private key. The authentication token can be encrypted so that it is secure when sent by the SSA service to the micro service. The authentication token carries information necessary for the micro service to access a second micro service directly through validation of the authentication token by the second micro service based in part on a private key of the micro service previously generated by the SSA service.

18 Claims, 18 Drawing Sheets

(51) Int. Cl.
  *H04L 29/06* (2006.01)
  *G06Q 20/40* (2012.01)
  *G06F 9/445* (2018.01)
  *G06F 8/60* (2018.01)
(52) U.S. Cl.
  CPC ............... *H04L 63/10* (2013.01); *G06F 8/60* (2013.01); *G06F 9/44505* (2013.01)
(58) Field of Classification Search
  CPC ... H04L 9/3247; H04L 9/3265; H04L 9/3297; G06F 9/547; G06F 9/44505; G06F 8/60; G06Q 20/401
  See application file for complete search history.

(56) References Cited

U.S. PATENT DOCUMENTS

| | | | | |
|---|---|---|---|---|
| 9,747,460 | B1 | 8/2017 | Kursun | |
| 9,824,354 | B1 | 11/2017 | Collison et al. | |
| 10,134,036 | B1 | 11/2018 | Collison et al. | |
| 2003/0220993 | A1* | 11/2003 | Blizniak | G06F 8/60 |
| | | | | 709/223 |
| 2006/0206932 | A1* | 9/2006 | Chong | H04L 67/02 |
| | | | | 726/10 |
| 2011/0041171 | A1 | 2/2011 | Burch et al. | |
| 2012/0204245 | A1 | 8/2012 | Ting et al. | |
| 2016/0063247 | A1* | 3/2016 | Farjon | G06F 21/562 |
| | | | | 726/23 |
| 2019/0166506 | A1* | 5/2019 | Ashrafi | H04W 12/06 |
| 2020/0259652 | A1* | 8/2020 | Schmaltz, III | H04L 63/0807 |

OTHER PUBLICATIONS

Silverman, "Tutorial: Establish Trust Between Microservices with JWT and Spring Boot." In: Stormpath. Dec. 13, 2016, Retrieved on Oct. 12, 2019 from https://stormpath.com/blog/microservices-jwt-spring-boot (entire document).

International Search Report and Written Opinion issued in corresponding International Application No. PCT/US2019/047045, dated Nov. 13, 2019 (8 pages).

Sarah Perez, Watch Out PayPal: Competitor WePay Drops Prices, Rolls Out White Label Payments API, Techcrunch.com (Aug. 14, 2012), https://techcrunch.com/2012/08/14/paypal-competitor-wepay-adds-white-label-api-drops-prices/.

* cited by examiner

| Java SSA Admin Client |
|---|

```
public class SSAAdminClient extends SSAClient {

/**
  * SSAAdminClient constructor initializes SSA administation session.
  *
  * @param    host             S SA Server URL
  * @param    port             SSA Server port
  * @param    name             Service name
  * @param    role             Admin role ("deploy", "configure", or "admin")
  * @param    privateKey       Service private key in PKCS#8 format, can be
  *                            null if authentication of this service is not
  *                            required
  * @param    adminRole        "deploy", "configure", or "admin"
  * @param    adminPrivateKey  Admin private key in PKCS#8 format
  */
 public SSAAdminClient(final String host, final int port, final String name,
                       final String privateKey,
                       final String adminRole,
                       final String adminPrivateKey)
        throws StatusRuntimeException /**
  * Register a service secret, service can be registered multiple times
  *  each time generating a new secret. Available for "deploy" role only.
  *
  * @param    name     Name of service to register
  * @return            Newly generated service secret
  */
 public String serviceRegister(final String name)
        throws StatusRuntimeException /**
  * Unregister a service secret, other secrets for the service are
  * unaffected. Available for "deploy" role only.
  *
  * @param    name     Name of service
  * @param    secret   Service secret previously returned by
  *                    serviceRegister()
  */
```

FIG. 3A

```java
public void serviceDelete(final String name, final String secret)
      throws StatusRuntimeException /**
 * Unregister all service secrets. Available for "deploy" role only.
 *
 * @param   name           Name of service to unregister
 */
public void serviceDeleteAll(final String name) throws StatusRuntimeException /**
 * Get service private key corresponding to instances with provided
 * serviceName/serviceSecret pair. Available for "configure" role only.
 *
 * @param   serviceName    Name of service
 * @param   serviceSecret  Service secret previously returned by
 *                         serviceRegister()
 * @return                 Service private key in PKCS#8 format
 */
public String getServicePrivateKey(final String serviceName,
                                   final String serviceSecret)
      throws StatusRuntimeException /**
 * Create a new SSA public key. Available for "admin" role only.
 *
 * @param   keyName    Name of public key to create, needs to be unique
 * @return             Base64 encoded public key in X.509 format
 */
public String createPublicKey(final String keyName)
      throws StatusRuntimeException /**
 * Delete SSA public key. Available for "admin" role only.
 *
 * @param   keyName    Name of public key to delete
 */
public void deletePublicKey(final String keyName)
      throws StatusRuntimeException /**
 * Set active SSA public key to be used for auth token generation.
 * Available for "admin" role only.
 *
 * @param   keyName       Name of public key to set as active
 */
public void setActivePublicKey(final String keyName) throws StatusRuntimeException
}
```

FIG. 3B

| Python SSA Admin Client |
|---|

```
class SSAAdminClient(SSAClient):
 def __init__(self, host, port, role, private_key):
   """
   SSAAdminClient constructor initializes an administrative session.

:param host:             SSA Server URL
   :param port:             SSA Server port
   :param name:             Service name
   :param private_key:      Service private key in PKCS#8 format, can be
                            null if authentication of this service is is not
                            required
   :param admin_role:       "deploy", "configure", or "admin"
   :param admin_private_key Admin private key in PKCS#8 format
   """

def service_register(self, service_name):
   """
   Register a service secret, service can be registered multiple times each
   time generating a new secret. Available for "deploy" role only.

:param name:      Name of service to register
   :return:          Newly generated service secret
   """

def service_delete(self, service_name, service_secret):
   """
   Unregister a service secret, other secrets for the service are unaffected.
   Available for "deploy" role only.

:param service_name:    Service name
   :param service_secret:  Service secret previously returned by
                           service_register()
   """

def service_delete_all(self, service_name):
   """
   Unregister all service secrets. Available for "deploy" role only.

:param service_name:    Service name
   """

def get_service_private_key(self, service_name, service_secret):
   """
```

FIG. 4A

```
  Get service private key corresponding to instances with provided
  serviceName/serviceSecret pair.
  Available for "configure" role only.

:param service_name:    Service name
  :param service_secret:  Service secret previously returned by service_register()
  :return:                Service private key in PKCS#8 format
  """

def create_public_key(self, key_name):
  """
  Create a new SSA public key. Available for "admin" role only.

:param key_name:        Name of the public key to create
  """

def delete_public_key(self, key_name):
  """
  Delete SSA public key. Available for "admin" role only.

:param key_name:        Name of the public key to delete
  """

def set_active_public_key(self, key_name):
  """
  Set active SSA public key to be used for auth token generation.
  Available for "admin" role only.

:param key_name:        Name of the public key to activate
  """
```

FIG. 4B

| Java SSA Client |
|---|

```
public class SSAClient {
  /**
   * SSAClient constructor initializes service client session.
   *
   * @param    host         SSA Server URL
   * @param    port         SSA Server port
   * @param    name         Service name
   * @param    privateKey   Service private key in PKCS#8 format, can be
   *                        null if authentication of this service is is not required
   */
  public SSAClient(final String host, final int port,
                   final String , final String privateKey)

/**
   * Authenticate the service with SSA Server and retrieve an auth token, which
   * can be used for API call authentication until it's expired.
   *
   * @param    secret       Service secret. Service might have multiple
   *                        secrets depending on deployment strategy.
   * @return                Auth token
   */
  public String serviceAuth(String secret) throws StatusRuntimeException /**
   * Validate auth token.
   *
   * @param    token        Auth token to validate
   * @return                true if auth token is valid, false otherwise
   */
  public boolean validateToken(String token) throws StatusRuntimeException
}
```

FIG. 5

Python SSA Client

```
class SSAClient:
 def __init__(self, host, port, service_name, private_key):
    """
    SSAClient constructor initializes a service client session.

:param host:          SSA Server URL
    :param port:          SSA Server port
    :param name:          Service name
    :param private_key:   Service private key in PKCS#8 format, can be null
                          if authentication of this service is not required
    """

def service_auth(self, secret):
    """
    Authenticate the  service with SSA Server and retrieve an auth token, which
    can be used for API call authentication until it's expired.

:param secret:    Service secret, service might have multiple secrets
                      depending on deployment strategy
    :return:          Auth token
    """

def validate_token(self, token):
    """
    Validate auth token.

:param token:   Auth token to validate
    :return:        True if auth token is valid, False otherwise
    """
```

FIG. 6

SSA proto file

```
service SSA {
  rpc ServiceAuth (ServiceAuthRequest) returns (ServiceAuthResponse) {};
  rpc ServiceRegister (ServiceRegisterRequest) returns
(ServiceRegisterResponse) {};
  rpc ServiceDelete (ServiceDeleteRequest) returns (ServiceDeleteResponse)
{};
  rpc ServiceDeleteAll (ServiceDeleteAllRequest) returns
(ServiceDeleteAllResponse) {};
  rpc GetServicePrivateKey (GetServicePrivateKeyRequest) returns
(GetServicePrivateKeyResponse) {};
  rpc CreatePublicKey (CreatePublicKeyRequest) returns
(CreatePublicKeyResponse) {};
  rpc DeletePublicKey (DeletePublicKeyRequest) returns
(DeletePublicKeyResponse) {};
  rpc SetActivePublicKey (SetActivePublicKeyRequest) returns
(SetActivePublicKeyResponse) {};
  rpc GetPublicKey (GetPublicKeyRequest) returns (GetPublicKeyResponse) {};
}
```

FIG. 7

| ServiceAuth |
|---|

```
message ServiceAuthRequest {
    string name = 1;
    string secret = 2;
} message ServiceAuthResponse {
    string auth_token = 1;
    string key = 2;
}
```

FIG. 8A

| ServiceRegister |
|---|

```
message ServiceRegisterRequest {
    string admin_token = 1;
    string name = 2;
} message ServiceRegisterResponse {
    string secret = 1;
}
```

FIG. 8B

| ServiceDelete |
|---|

```
message ServiceDeleteRequest {
    string admin_token = 1;
    string name = 2;
    string secret = 3;
} message ServiceDeleteResponse {
}
```

FIG. 8C

| ServiceDeleteAll |
|---|

```
message ServiceDeleteAllRequest {
    string admin_token = 1;
    string name = 2;
} message ServiceDeleteAllResponse {
}
```

FIG. 8D

| GetServicePrivateKey |
|---|

```
message GetServicePrivateKeyRequest {
    string admin_token = 1;
    string name = 2;
    string secret = 3;
} message GetServicePrivateKeyResponse {
    string private_key = 1;
}
```

FIG. 8E

| CreatePublicKey |
|---|

```
message CreatePublicKeyRequest {
    string admin_token = 1;
    string public_key_name = 2;
} message CreatePublicKeyResponse {
    string public_key = 1;
}
```

FIG. 8F

| DeletePublicKey |
|---|

```
message DeletePublicKeyRequest {
    string admin_token = 1;
    string public_key_name = 2;
} message DeletePublicKeyResponse {
}
```

FIG. 8G

| SetActivePublicKey |
|---|

```
message SetActivePublicKeyRequest {
    string admin_token = 1;
    string public_key_name = 2;
} message SetActivePublicKeyResponse {
}
```

FIG. 8H

| GetPublicKey |
|---|

```
message GetPublicKeyRequest {
    string public_key_name = 1;
} message GetPublicKeyResponse {
    string public_key = 1;
}
```

FIG. 8I

Anatomy of Auth Token

```
auth_token =
base64URLEncode(Header)+"."+base64URLEncode(Payload)+"."+base64URLEncode(S
ignature)

Header:
  {
     "typ": "JWT",
     "alg": "RS256",
     "key": "34512634562"
  }

Payload:
  {
     "service": "myservice",
     "iat": 1476144000,
     "exp": 1476145200,
     "sub": "auth",
     "ip": "10.16.0.71"
  }

Signature:
PrSS(SHA256(base64URLEncode(Header)+"."+base64URLEncode(Payload)))
```

FIG. 9

Deployer usage example in Java

```
try {
 deployClient = new SSAAdminClient("216.3.128.12",
1234, "Service_Deployer", "deploy", null, deployPrivateKey);
 String secret1 = deployClient.serviceRegister("service1");
} catch (Exception e) {
    log.info(e.getMessage());
}
```

FIG. 10A

Configurator usage example in Python

```
from SSA_pclient.SSAAdminClient import SSAAdminClient
configure_client = SSAAdminClient("216.3.128.12", 1234,
"Service_Configurator", "configure", None, configurePrivateKey)
private_key1 = configure_client.get_service_private_key("service1",
secret1)
```

FIG. 10B

Service authentication example Java

```
client1 = new SSAClient("216.3.128.12", 1234, "service1", privateKey1);
String token1 = client1.serviceAuth(secret1);
```

FIG. 10C

Service auth token validation in Java

```
client2 = new SSAClient("216.3.128.12", 1234, "service2",  privateKey2);
if (client2.validateToken(token1)) {
    log.info("Good token!");
} else {
    log.info("Bad token...");
}
```

FIG. 10D

Deployer deprovisioning example in Java

```
try {
 deployClient = new  SSAAdminClient("216.3.128.12",
1234, "Service_Deployer", "deploy", null, deployPrivateKey);
 deployClient.serviceDeleteAll("service1");
} catch (Exception e) {
    log.info(e.getMessage());
}
```

FIG. 10E

SYSTEM AND METHOD FOR SERVICE-TO-SERVICE AUTHENTICATION

FIELD OF THE INVENTION

The present invention relates generally to authentication of web services, and more particularly to an automated system and method for providing authentication services between a first web service and a second web service.

BACKGROUND

Online payment systems continue to evolve as business models change and new online businesses are launched. Companies also endeavor to continually improve their customer experience through better interfaces. These types of improvements frequently rely on increased data acquisition, data analytics and automation to make the customer experience more enjoyable by reducing the steps that the customer is required to carry out.

In many cases, the data acquisition, data analytics or automation may involve one web service calling upon another web service to perform a process and/or provide data. For example, a first web service may call a second web service to obtain a currency conversion, place an order, or request account information. In a web service, the web technology such as HTTP, originally configured for human-to-machine communication, is utilized for machine-to-machine communication, e.g., for transferring machine-readable file formats such as XML and JSON. In general, "web services" or "micro services" refers the technologies used to transmit data across a network by using standard Internet protocols such as HTTP. One advantage of web services is that, because they generally conform to open standards, a web service written on one platform (e.g., Microsoft platform) can call another web service written on another platform (e.g., Linux). Another advance in web services is the development of web application programming interfaces (APIs), which provide simpler representational state transfer (REST) based communications, as they do not require XML-based web service protocols (e.g., SOAP and WSDL) to support their interfaces.

While the use of web services can provide great benefits by automating various business processes, such as those involved in a customer experience, web services can also introduce certain challenges, such as security risks based on authentication of one web service by another. Particularly in the payment space, the security of transactions is critically important, especially with the increasing sophistication of hackers and growing use of automated web services. It would be beneficial, therefore, to have a service to service authentication method and system that was highly secure and efficient.

SUMMARY

According to one embodiment, the invention relates to a computer-implemented system and method for service-to-service authentication ("SSA"). The method may be executed on a specially programmed computer system comprising one or more computer processors, electronic storage devices, and networks. The method may comprise deploying the SSA service in the form of software on an SSA server. A first micro service (e.g., a web service) comprising software on a web server can be deployed, which may include the steps of authenticating a service deployer and registering the first micro service using a service secret. An SSA client can be provided that comprises software serving as an interface between the first micro service and the SSA service. The first micro service can send, via the SSA client, a request to the SSA service for an authentication token. The SSA service then generates the authentication token for the first micro service. The authentication token is signed by the SSA service using an SSA service private key and the authentication token has a limited lifespan for security. The authentication token can be encrypted so that it is secure when sent by the SSA service to the first micro service. The authentication token carries information necessary for the first micro service to access a second micro service directly through validation of the authentication token by the second micro service based at least in part on a private key of the first micro service previously generated by the SSA service. In this way, the SSA service can provide a secure an efficient method of providing an authentication service between a first micro service and a second micro service.

According to exemplary embodiments of the invention, one micro service can authenticate a second micro service without making calls to the SSA service. The SSA service can leverage an RSA algorithm, for example, to authenticate the tokens, and consequently the SSA system can prevent any party other than the micro service that requested the token from decrypting it. The system can also be configured so that the authentication token cannot be used unless it originates from the same interne protocol (IP) address as the requesting micro service. The SSA system can also be designed so that it is scalable, robust, secure, capable of handling multiple protocols, and container-friendly. The SSA service can use JSON Web Token (JWT) technology which makes it stateless and scalable. The SSA service can leverage gRPC, for example, for calls from an SSA client to the SSA service, which makes inter-service communications more robust than RESTful calls. The SSA service can also run in both Kubernetes clusters and Google Cloud Platform (GCP) or any other virtual machines. These and other advantages will be described further in the detailed description below.

BRIEF DESCRIPTION OF THE DRAWINGS

In order to facilitate a fuller understanding of the present invention, reference is now made to the attached drawings. The drawings should not be construed as limiting the present invention, but are intended only to illustrate different aspects and embodiments of the invention.

FIGS. 3A and 3B illustrate an example of an SSA admin client in Java according to an exemplary embodiment of the invention.

FIGS. 4A and 4B illustrate an example of an SSA admin client in Python according to an exemplary embodiment of the invention.

FIG. 5 illustrates an example of an SSA client in Java according to an exemplary embodiment of the invention.

FIG. 6 illustrates an example of an SSA client in Python according to an exemplary embodiment of the invention.

FIG. 7 illustrates a proto definition for internal gPRC calls according to an exemplary embodiment of the invention.

FIGS. 8A-8I illustrate proto definitions of internal gPRC messages according to an exemplary embodiment of the invention.

FIG. 9 illustrates the anatomy of an authentication token according to an exemplary embodiment of the invention.

FIGS. 10A-10E illustrate examples of deployment, configuration, and use of the SSA service according to an exemplary embodiment of the invention.

DETAILED DESCRIPTION

Exemplary embodiments of the invention will now be described in order to illustrate various features of the invention. The embodiments described herein are not intended to be limiting as to the scope of the invention, but rather are intended to provide examples of the components, use, and operation of the invention.

Figure 1:
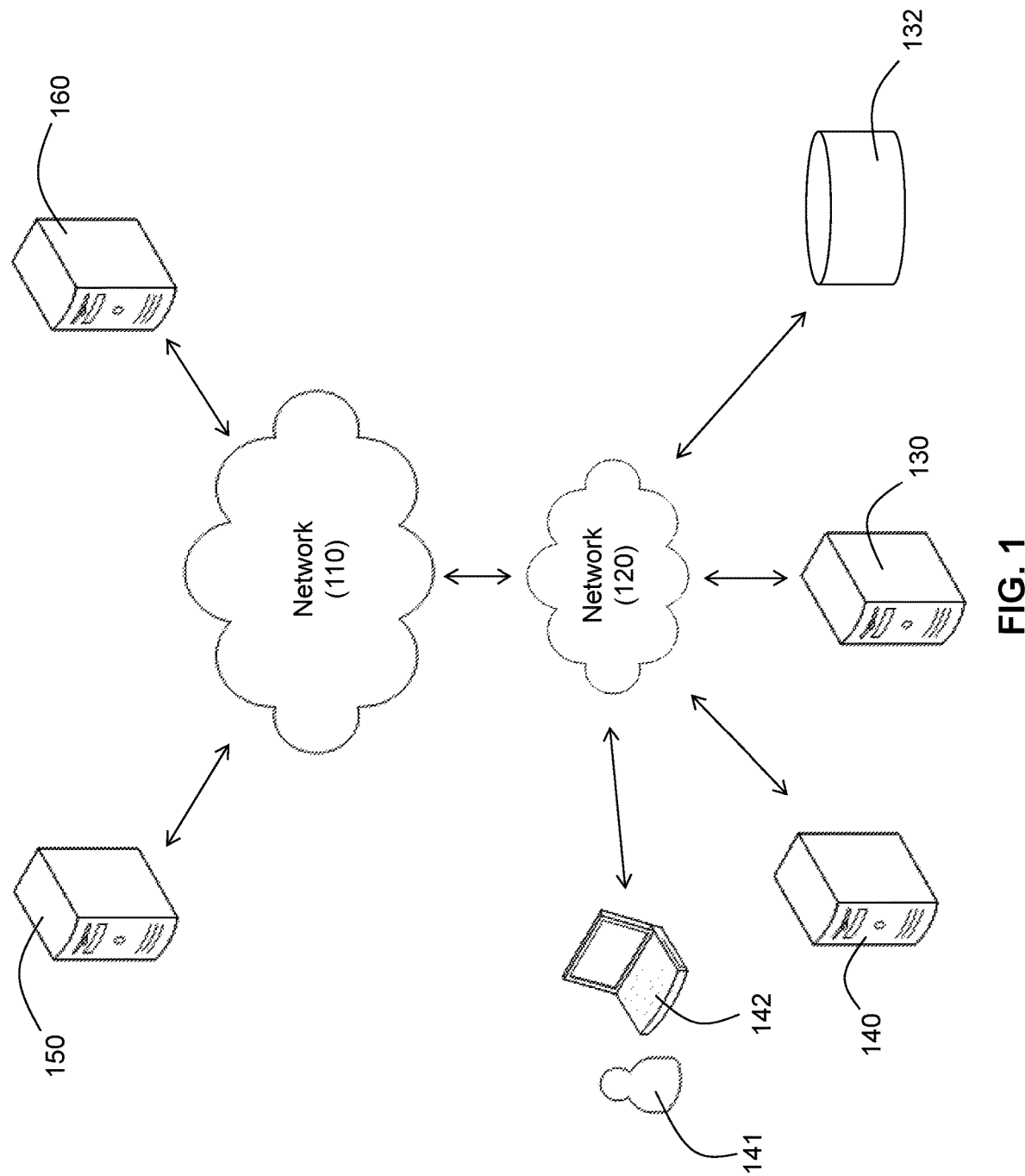
FIG. 1 is a diagram of a system for providing service-to-service authentication according to an exemplary embodiment of the invention.

Referring now to the drawings, FIG. 1 is a diagram of a service-to-service authentication (SSA) system according to an exemplary embodiment of the invention. As shown in FIG. 1, the system may include one or more computing devices, such as servers 130, 140, 150, 160, database 132, and personal computer 142. The system may also include one or more networks 110, 120 that connect the various computing devices shown in FIG. 1. The networks may comprise, for example, any one or more of the Internet, an intranet, a Local Area Network (LAN), a Wide Area Network (WAN), an Ethernet connection, a WiFi network, a Global System for Mobile Communication (GSM) link, a cellular phone network, a Global Positioning System (GPS) link, a satellite communications network, or other network, for example. The system may be operated by a business or other type of organization that provides service-to-service authentication (SSA) services to its customers and to other parties. According to one particular example, the SSA system is operated by a service provider that provides secure and customized payment services and other services to its customers.

In FIG. 1, the SSA system may be embodied primarily in an SSA server 130, which provides the SSA service according to an exemplary embodiment of the invention. The SSA server 130 may be owned and/or operated by the business or other organization that provides the SSA service to its customers. Also illustrated in FIG. 1 is an administration (admin) server 140 that may be used by the business to administer, deploy, and configure the SSA service. Although a single admin server 140 is depicted in FIG. 1, in practice the admin server 140 may comprise admin SSA client libraries that provide three separate or distinct administrative roles and functions, and these three administrative functions may be performed by three distinct servers, according to an exemplary embodiment of the invention. One or more administrators 141, such as information technology (IT) staff members, may access the admin server 140 (or one of its components based on designated access privileges) through his or her personal computing device 142, such as a desktop computer, laptop computer, table computer or mobile phone. The SSA system may also include a backend database 132 for storing data used to operate the SSA system, such as encryption keys, secret codes, configuration information, deployment information, service information, and other data, as will be described further below. The SSA server 130, database 132, and admin server 140 may all be linked through a network 120, such as a local area network or intranet, operated by the business that provides a secure environment for operating and providing the SSA service.

FIG. 1 also illustrates two additional servers 150, 160 that may each be used to provide services to customers. These services may be referred to herein as "micro services" or "web services" and the servers 150, 160 may comprise web servers. According to one example, web server 150 may be operated by a third party payment service business and web server 160 may be operated by a third party merchant. These web servers 150, 160 may call each other directly via the network 110 (e.g., the Internet). Exemplary embodiments of the invention provide the SSA service via the SSA server 130 that enables one web server (e.g., 150) to authenticate another web server (e.g., 160) when sending, receiving, or requesting information, e.g., via an API. Although FIG. 1 shows only two web servers 150, 160 to illustrate an example of the operation of the invention, in practice many more web servers will be operated by various third parties, making calls to each other for various micro services, and using the functionality provided by the SSA server 130 to authenticate the other web servers as needed. According to various embodiments, the micro services are implemented in Java, Python, or other development stack. No predetermined programming language is required, as micro services communicate via a standard protocol.

Figure 2:
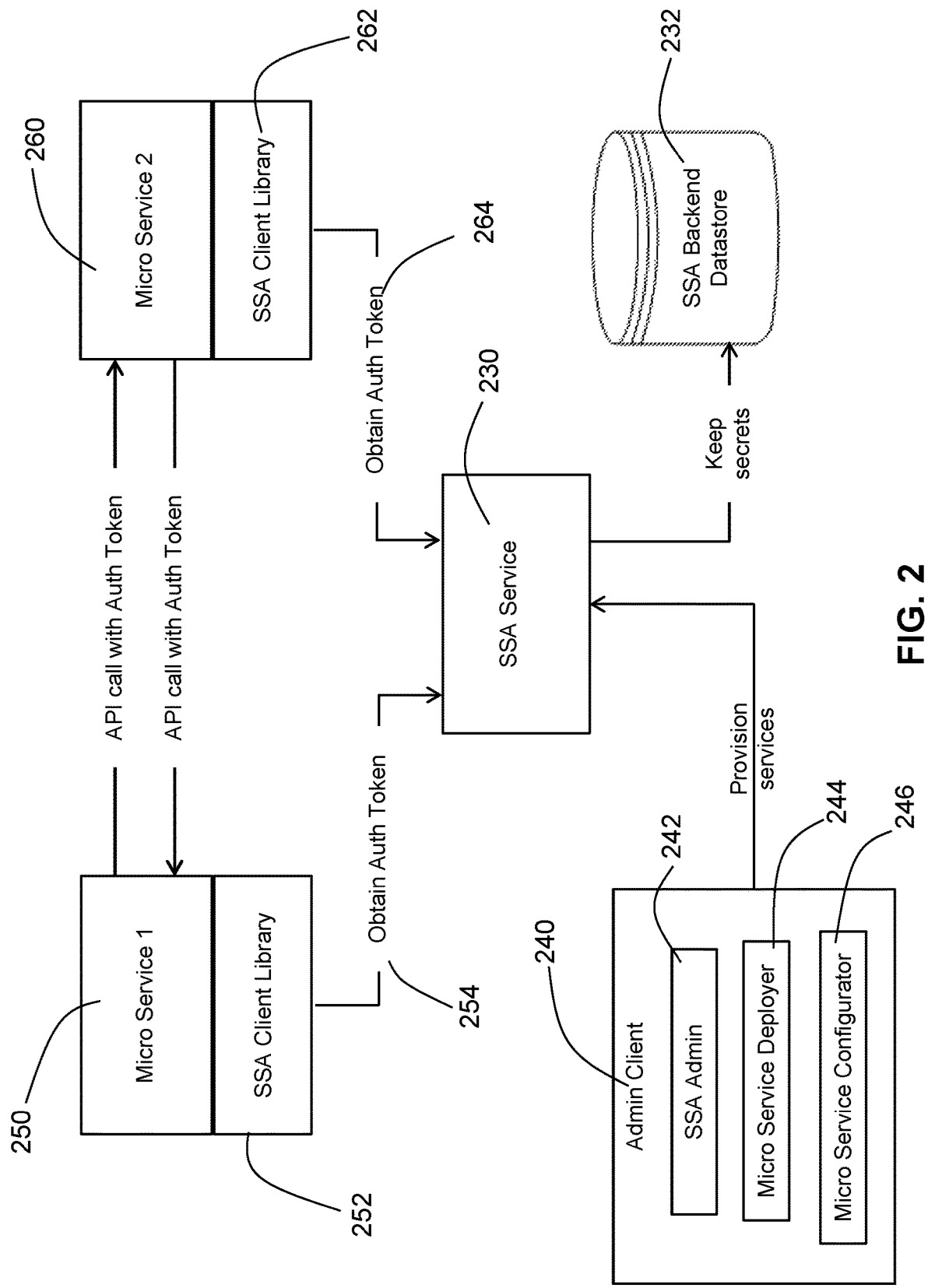
FIG. 2 is a diagram of a system for providing service-to-service authentication according to an exemplary embodiment of the invention.

FIG. 2 illustrates a system architecture for the service-to-service authentication (SSA) system according to an exemplary embodiment of the invention. As shown in FIG. 2, the SSA system architecture includes the SSA service 230. The SSA service 230 in FIG. 2 may comprise a cluster of SSA services and servers, for example, which will be a common configuration since it is stateless for scalability. The SSA system architecture also includes the backend datastore 232 and an admin client 240. The admin client 240 may comprise an admin SSA client library that provides various functions, such as an SSA admin function 242, a mirco service deployer 244, and a micro service configurator 246, for example. According to one embodiment of the invention, the SSA service 230 comprises a software module executed on the SSA server 130 that provides service-to-service authentication coordination via exposed gRPC methods. gRPC is an open source remote procedure call (RPC) system. It uses HTTP/2 for transport, protocol buffers (e.g., a language-neutral, platform-neutral extensible mechanism for serializing structured data) as the interface description language, and provides features including authentication, bidirectional streaming and flow control, blocking or non-blocking bindings, and cancellation and timeouts. It can generate cross-platform client and server bindings for a number of languages. Examples of the gRPC calls that are used in the SSA system are illustrated in FIGS. 7 and 8, which will be discussed further below.

Authentication Tokens. The SSA service 230 uses authentication tokens to provide service-to-service authentication. According to one embodiment, the SSA service 230 generates an authentication token comprising a JSON Web Token (JWT) that is used for authenticating a micro service 250 or 260 (e.g., a web service provided by web server 150 or 160) to application programming interface (API) endpoints. The term "API endpoint" generally refers to the place that APIs send requests and where the resource resides. As shown in FIG. 2, the SSA service 230 receives a request 254 from a micro service 250 to obtain an authentication token. The SSA service 230 responds by providing the authentication token to the micro service 250.

The authentication token is a JSON Web Token (JWT) signed by the SSA service 230 using its own private key according to one embodiment. The private key for the SSA service may be abbreviated herein as "PrSS." JWT is a compact URL-safe means of representing claims to be transferred between two parties. The claims in a JWT are encoded as a JSON object that is digitally signed using JSON Web Signature (JWS).

According to one embodiment of the invention, authentication tokens carry the necessary information to access a resource (e.g., sensitive information provided by another micro service) directly. In other words, when a client passes an authentication token to a server managing a resource, that server can use the information contained in the authentication token to determine whether the client is authorized or not, as described below. Authentication tokens may have an expiration date which defines a relatively short time period (e.g., one hour) to enhance security according to a preferred embodiment of the invention. The authentication token can be used for API calls authentication until the token expires. The SSA client libraries 252, 262 described below provide a method of validating the authentication token. An example of the anatomy of an authentication token, including the header, payload, and signature, is shown in FIG. 9.

The SSA service 230 is preferably the sole authentication token provider used for service-to-service authentication. According to one embodiment, every new micro service introduced in production or other environment that desires to communicate with another micro service hosting sensitive information must be deployed and configured for authentication by the SSA service 230.

According to one embodiment, an authentication token may be considered valid if: (1) it is signed with a valid SSA service private key ("PrSS"); (2) it is not expired (i.e., the time in the "exp" field is smaller than the current time; (3) its "service" field matches the service name; (4) its "sub" field is "auth"; and (5) and optionally its "IP" field matches the requester IP (interne protocol) address.

SSA Clients. Also shown in FIG. 2 are two examples of SSA clients 252, 262, each associated with a micro service (e.g., a web service) 250, 260 respectively. The SSA clients 252, 262 may comprise software including Java and Python libraries, for example, that provide interfaces for micro services 250, 260, respectively, for communication with the SSA service 230. Micro services 250, 260 requiring or validating authentication communicate with the SSA service 230 by SSA clients 252, 262. SSA clients 252, 262 provide abstraction for gRPC build dependencies and for communication protocol logic. For example, the client library 252 eliminates the need for the micro service 250 to directly interface with libraries required to run gRPC, or to include or use gRPC generated source code.

SSA client libraries 252, 262 provide a method to perform the validation of authentication tokens (validateAuthToken( )). SSA clients 252, 262 provide an easy-to-use interface to integrate with micro services 250, 260 which require either being authenticated to access protected APIs or to validate an authentication token from a requesting micro service. SSA clients 252, 262 also allow other infrastructure services (e.g., services provided by the micro service deployer 244 and micro service configurator 246 described below) to provision, deprovision, and configure services for authentication.

FIG. 5 illustrates a Java API version of the SSA client 252, 262 according to an exemplary embodiment of the invention. As shown in FIG. 5, the SSA client may include an initialization component to initialize a service client session, a service authorization component to authorize a service with the SSA server 130 and retrieve its authentication token, and an authentication token validation component to determine whether an authentication token is valid. FIG. 6 illustrates Python version of the SSA client having similar components and functionality.

Admin Client. In addition to the SSA client role described above, which allows micro services 250, 260 to authenticate themselves with the SSA service 230 and to validate authentication tokens of other micro services, the SSA service 230 also provides three additional client roles. The three additional client roles include an SSA service administrator, a micro service deployer, and a micro service configurator according to one embodiment. FIG. 2 depicts the admin client 240. According to a preferred embodiment, the admin client 240 comprises three distinct servers 242, 244, 246 with software and data residing on each server to provide these administrative functions associated with the SSA service 230. As shown in FIG. 2, the admin client 240 may include an SSA service administrator 242, a micro service deployer 244, and a web service configurator 246. According to one embodiment, the admin client 240 is designed to be used by three different services having separate administrative roles and thus different access privileges to the different administrative functions. The SSA service administrator 242 is a functionality within the admin client 240 that enables the administrator 141 to deploy the SSA service 230. The micro service deployer 244 enables deploying and undeploying mircro services. The micro service configurator 246 enables configuring micro services.

According to an exemplary embodiment of the invention, the admin client 240 is available for both Java and Python and can be used by infrastructure services to administer running instances of the SSA service 230. Infrastructure services (e.g., SSA admin, service deployer, and service configurator) may comprise services providing application micro services an operational environment.

FIGS. 3A and 3B illustrate an example of a Java admin client 240 according to one embodiment of the invention. As shown in FIGS. 3A and 3B, the Java admin client includes components to initialize an admin client administration session, register a service secret, unregister a service secret, unregister all service secrets, get a service private key, create a new SSA service public key, delete an SSA service public key, and set an active SSA service pubic key to be used for authentication token generation. The SSA Amin role can also be used to manually rotate SSA public keys (PuSS). FIGS. 4A and 4B illustrate an example of an admin client 240 in Python having similar components and functionality.

FIG. 2 also illustrates a backend datastore 232, which provides a secure storage area for storing keys, passwords, secrets associated with a micro service, certificates, database credentials, and other secret information used to administer the SSA service 230. According to one embodiment of the invention, the backend datastore 232 may comprise a secure storage service, such as HashiCorp Vault.

SSA Service Deployment. Initially, the SSA service 230 itself must be deployed. The SSA service 230 may be integrated tightly with the micro service configurator 246 according to one embodiment of the invention. Because micro service deployment for authentication requires the SSA service 230 to be operational, the SSA service 230 needs to be deployed before it can be used by a micro service participating in service-to-service authentication. According to one embodiment of the invention, the following steps are carried out to deploy the SSA service 230.

1. First, the SSA service 230 is deployed on the SSA server 130 and executed. On startup it checks the following entries in the backend datastore 232 and creates those it fails to find: (a) 2048-bit RSA key pair for the micro service deployer 244 to use with SSA Admin Client; (b) 2048-bit RSA key pair for the micro service configurator 246 to use with SSA Admin Client; (c) 2048-bit RSA key pair for SSA administrator service to use with SSA Admin Client; and (d) 2048-bit RSA key pair for signing and validating authentication tokens, in which a newly created public key is set as the default. RSA is a well-known public key cryptosystem, as will be appreciated by those skilled in the art.

2. Read web service deployer private key for future use by the micro service deployer 244.

3. Read the micro service configurator private key for future use by micro service configurator 246.

Micro Service Deployment. After the SSA service 230 has been deployed, micro services (e.g., 250, 260) can then be deployed. During micro service deployment, a unique service secret is generated by the SSA service 230 for the micro service instance or for a group of micro service instances along with a public-private key pair. The public key and private key for micro service K may be abbreviated herein as PuSK and PrSK, respectively. Multiple public-private key pairs can be associated with a micro service. Each public-private key pair will have a unique secret associated with it. All artifacts created during micro service deployment (e.g., RSA public-private key pairs and secrets associated with micro service instances or groups of instances) are stored by the SSA service 230 in the backend datastore 232.

To provision a micro service 250, 260 with the micro service deployer 244 the following steps are carried out, according to one embodiment of the invention.

1. The micro service 250, 260 authenticates itself as a micro service deployer using SSAAdminClient class providing the micro service deployer private key as a parameter.

2. A call is made to SSAAdminClient.serviceRegister (serviceName), and if successful it returns a service secret, which later can be used by both the micro service deployer 244 and micro service configurator 246. The micro service 250, 260 can be registered once, and the returned service secret can be reused for all or some instances of the micro service. However, according to a preferred embodiment, for enhanced security, services are registered once per service instance. On each successful call this operation will generate a new service secret along with a public-private key pair (PuSK, PrSK). This approach deploys micro service instances with distinct authentication credentials (micro service private keys and micro service secrets will be different).

3. The service secrets obtained are transferred to the micro service configurator 246 in a secure manner.

4. SSAAdminClient.serviceDeleteAll(serviceName) is used to unregister service secrets when corresponding service instances are no longer required.

Micro Service Configuration. After a micro service 250, 260 is deployed it typically needs to be configured. To configure a micro service the micro service configurator 246 carries out the following steps according to one embodiment of the invention.

1. The micro service configurator 246 obtains the service secret from the micro service deployer 244.

2. The micro service configurator 246 authenticates itself as a micro service configurator using SSAAdminClient class with the micro service configurator private key.

3. The micro service configurator 246 calls SSAAdminClient.getServicePrivateKey(serviceName, serviceSecret) to retrieve the micro service private key (PrSK). Micro service private keys are unique for a serviceName/service Secret pair.

4. The micro service configurator 246 injects the service secret and micro service private key information to two different locations for the micro service to pick up (for example, one in the micro service configuration file, and another one in a separate file).

Once the new micro service is started, it can contact the SSA service 230 to receive its authentication token to use for API calls requiring authentication.

FIGS. 10A-10E provide examples of the deployment, configuration and use of a micro service. In FIG. 10A, the micro service deployer 244 registers a new service instance and retrieves its secret. In FIG. 10B, the micro service configurator retrieves a service instance private key to configure it. In FIG. 10C, a micro service authenticates itself and retrieves its authentication token. In FIG. 10D, another micro service validates the authentication token. In FIG. 10E, the micro service deployer undeploys a micro service.

Examples of the gRPC calls that are used in the SSA system are illustrated in FIGS. 7 and 8. As shown in FIGS. 7 and 8A-8I, ServiceAuth authenticates a client service instance with the SSA service and retrieves its authentication token, which can be used for API calls until it has expired. ServiceRegister is used to register a service secret. A micro service can be registered multiple times, each time generating a new secret. According to one embodiment, ServiceRegister is available for a "deploy" role only. During this process, the SSA service generates a new public-private key pair (PuSK, PrSK) for the micro service being provisioned. ServiceDelete is used to unregister a micro service. Other secrets for the service are unaffected. ServiceDeleteAll is used to unregister all secrets associated with the specified service. This undeploys the service completely. GetServicePrivateKey is used to get the service private key corresponding to instances with provided name/secret pair. This is available for the "configure" role. CreatePublicKey is used to create a new SSA public key. This is available for the "admin" role. DeletePublicKey is used to delete the SSA service public key. This is available for the "admin" role. SetActivePublicKey is used to set the active SSA service public key to be used for generation of authentication tokens. This is available for the "admin" role. GetPublicKey is used to retrieve the SSA service public key by name.

Figure 11:
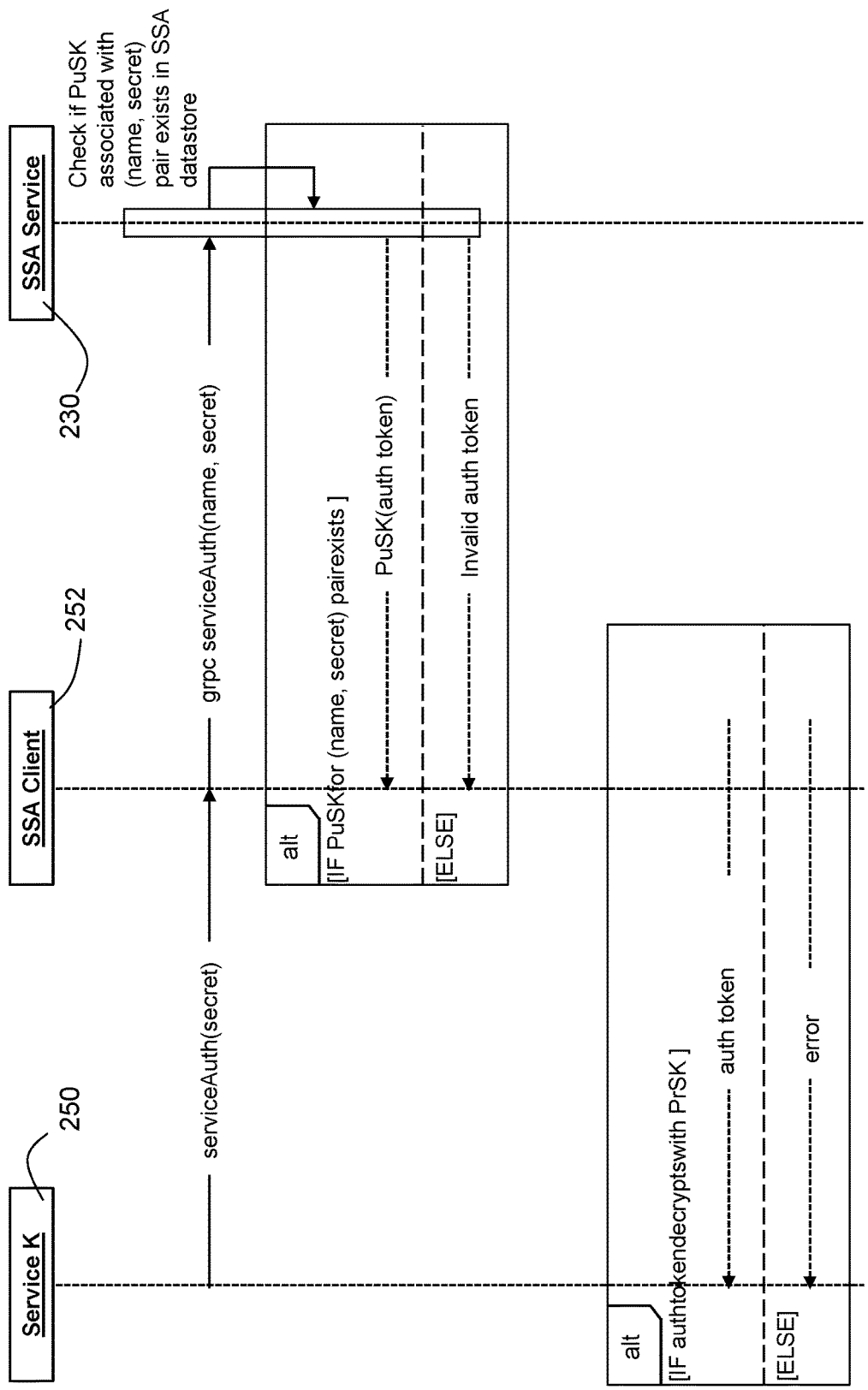
FIG. 11 illustrates an example communication flow for fetching an authentication token according to an exemplary embodiment of the invention.

After deployment and configuration, a micro service 250, 260 can contact the SSA service 230 to receive its authentication token, which, according to a preferred embodiment, is mandatory to access protected resources hosted by other services. FIG. 11 illustrates the communication flows involved in fetching an authentication token according to one example. As shown in FIG. 11, the micro service 250 (Service K) sends a request including the micro service secret to the SSA client 252, which then transmits a gRPC request with the micro service secret to the SSA service 230. The SSA service 230 checks if the micro service public key (PuSK) associated with the service name and secret pair exists in the backend database 232. If the PuSK for the service name and secret pair exists, the SSA service 230 sends the authentication token. If not, the SSA service 230 sends a message indicating an invalid authentication token. FIG. 11 also illustrates that if the authentication token decrypts with the micro service private key (PrSK), then the SSA client 252 sends the authentication token to the micro service 250, else the SSA client 252 indicates an error.

Figure 12:
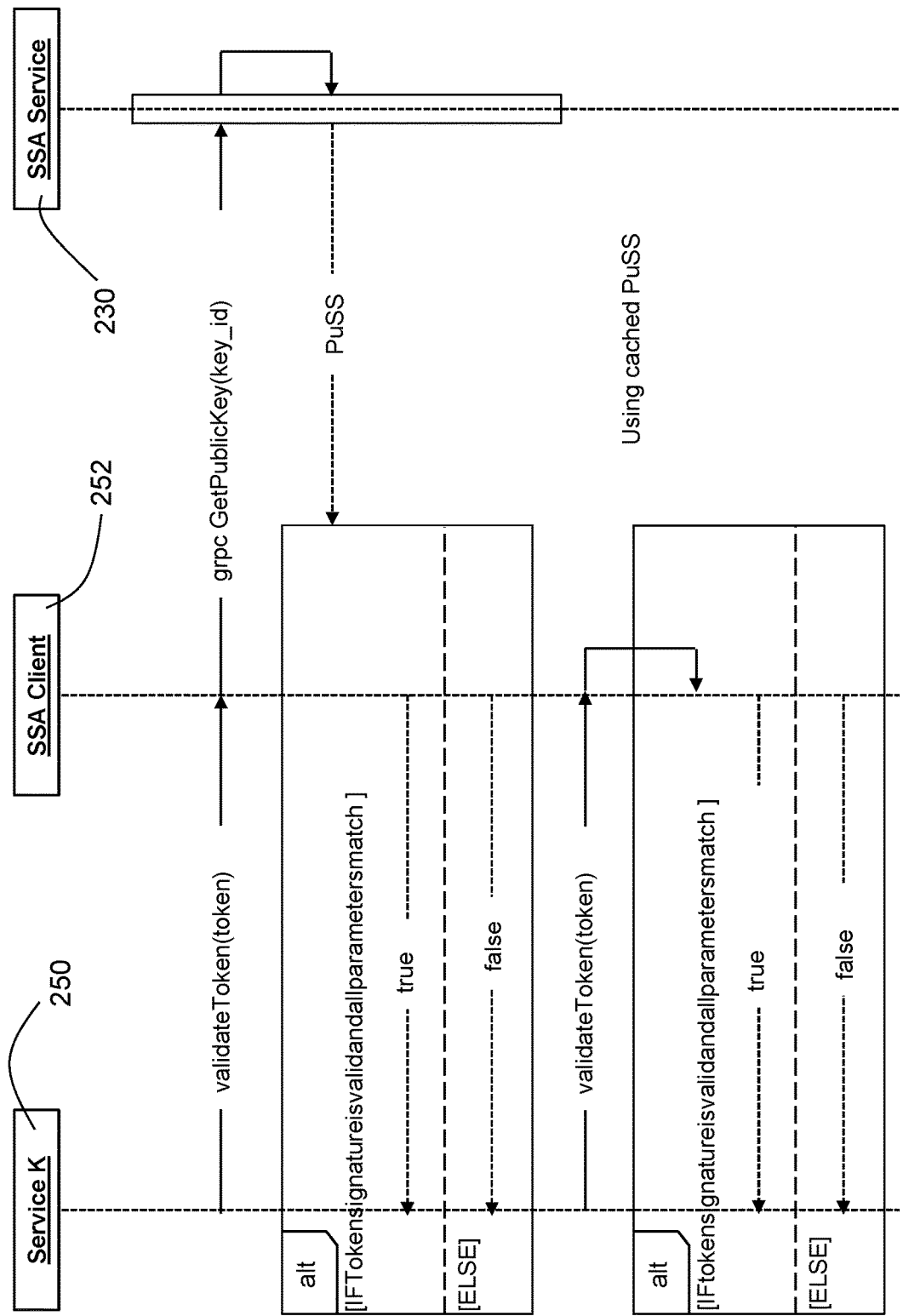
FIG. 12 illustrates an example communication flow for validation of an authentication token according to an exemplary embodiment of the invention.

FIG. 12 illustrates an example of the communication flow for authentication token validation according to an exemplary embodiment of the invention. As shown in FIG. 12, a micro service can validate the authenticity of an authentication token received in an API request. The process begins with the micro service 250 making a validateToken(token) call to the SSA client 252 with the received authentication token. The SSA client 252 then makes a grpc GetPublicKey (key_id) call to the SSA service 230. The SSA service 230 responds by transmitting the SSA service public key (PuSS) to the SSA client 252. Using PuSS the SSA client 252 determines if the token signature is valid and all parameters match, which indicates that the received token is valid. Otherwise, the SSA client 252 indicates the received authentication token is invalid. FIG. 12 also illustrates that the SSA client 252 may use a cached public key (PuSS) for the SSA service 230, in which case the SSA client 252 executes the same evaluation to determine if the received authentication token is valid or invalid. If the cached public key PuSS is used, the SSA client 252 does not need to contact the SSA service 230. An advantage of this method is token validation without communication and processing power overhead on the SSA service side, which makes the authentication infrastructure easily scalable.

Figure 13:
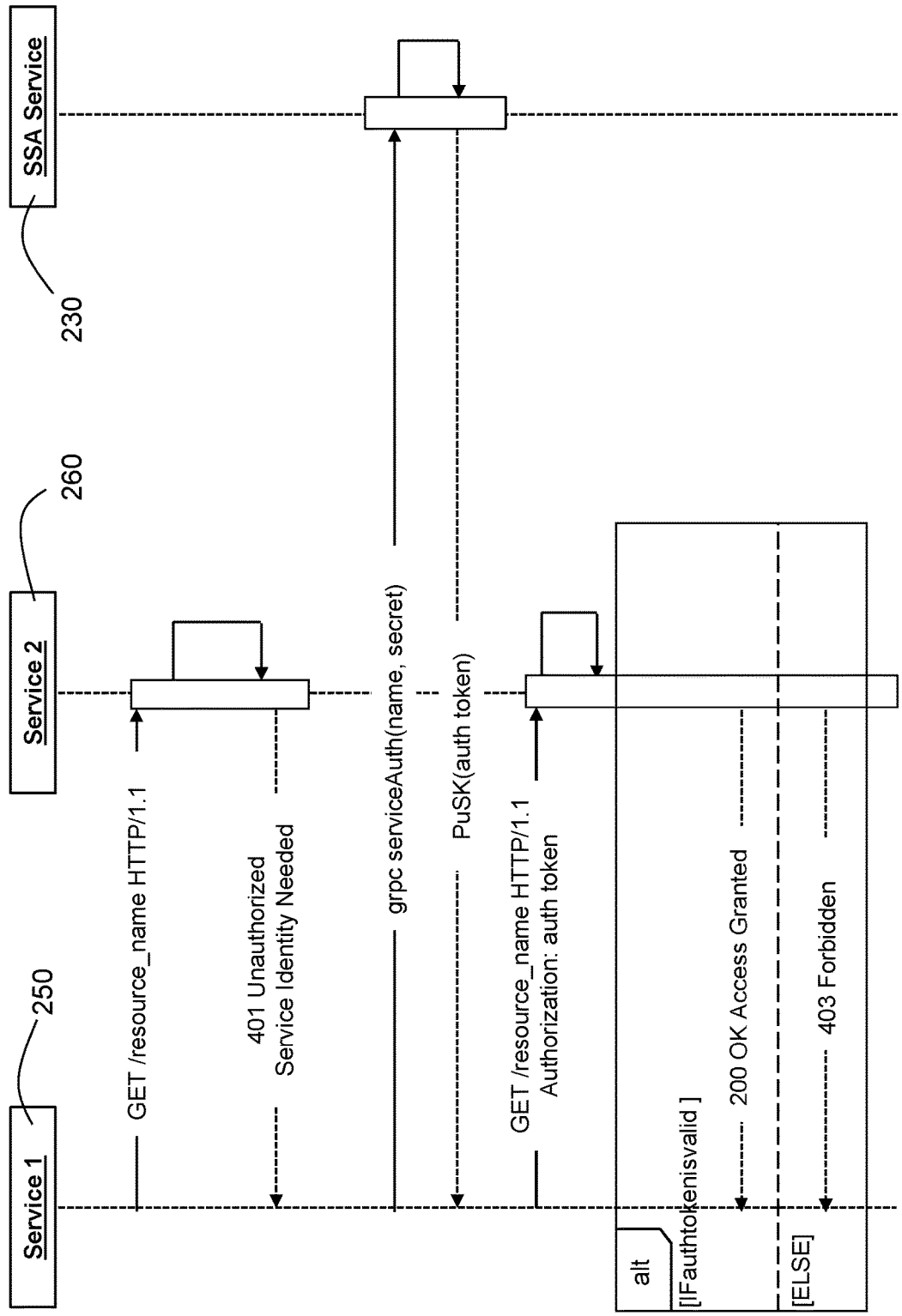
FIG. 13 illustrates an example communication flow for service-to-service authentication according to an exemplary embodiment of the invention.

FIG. 13 illustrates an example of a micro service-to-micro service authentication (SSA) flow according to an exemplary embodiment of the invention. As shown in FIG. 13, micro service 1 attempts to access a resource hosted by micro service 2 using a RESTful call. If the request does not contain an authentication token or contains an invalid authentication token, micro service 2 returns an error. In case the request contains a valid authentication token, micro service 2 verifies the access privileges of the caller and responds to the request accordingly.

According to a preferred embodiment of the invention, the SSA system is designed so that it is scalable, robust, secure, capable of handling multiple protocols, and container-friendly. As discussed above, the SSA service 230 can use JSON Web Token (JWT) technology which makes the SSA service stateless and scalable. A micro service 250, 260 being authenticated needs to make a call (once per configurable authentication token lifespan period) to the SSA service 230 to exchange its credentials for an authentication token which can be used to make subsequent requests to other micro services. Validation of the authentication token does not require calls to the SSA service 230, except for one call upon SSA client initialization in order to retrieve the SSA pubic key. The service validation function in the SSA client makes a call to the SSA service 230 only once per SSA public key used, which happens only once under most circumstances. This call typically happens on the first authentication token validation by the SSAClient.validateToken(token) function.

The SSA service 230 can leverage gRPC for calls from SSA clients 252, 262, to the SSA service 230 which makes inter-service communications more robust than regular RESTful calls due in part to binary serialization provided by Google Protobuf. For example, gRPC can provide high performance with Google protobuf and HTTP/2 protocol which is a multiplexed, single TCP connection, transports data as binary, and enables duplex streaming according to one embodiment of the invention.

The SSA service 230 can be highly secure by design, for the following reasons. First, the SSA system 230 can use RSA signed JWT tokens, which means only the SSA service 230 can issue authentication tokens as long as its RSA private key is not compromised. Second, the authentication tokens have limited lifespan, so in case an authentication token is compromised, the time window during which the authentication token might be useful is limited in duration. Third, the authentication tokens can be RSA-encrypted during delivery from the SSA service 230 to the micro service 250, 260 being authenticated. The RSA private key used to decrypt the authentication token is unique per client service instance. This feature mitigates the risk of an authentication token being intercepted in transit. Fourth, authentication tokens can be tied to a client service IP address. That is, the SSA system can be configured such that a first micro service does not validate an authentication token from a second micro service unless the IP address stored in the authentication token from the second micro service matches the IP address from the second (requesting) micro service. This feature can render authentication tokens useless from any other virtual machine or container. The IP address validation feature can easily coexist with dynamic IP addresses of the micro services, in case that dynamic IP addresses are used. In the case that the micro service 250 moves to a different IP address the authentication token becomes invalid, however in such a case a new authentication can be obtained by the client micro service.

The SSA service 230 serves gRPC requests for business logic calls and RESTful requests for legacy infrastructure compatibility. The SSA service 230 can also run in both Kubernetes clusters and GCP and other virtual machines. Hence, the authentication method described herein is seamlessly compatible with both virtual machines and containers according to a preferred embodiment.

Those skilled in the art will appreciate that the system diagrams discussed above are merely examples of a SSA system configuration and are not intended to be limiting. Other types and configurations of networks, servers, databases and personal computing devices (e.g., desktop computers, tablet computers, mobile computing devices, smart phones, etc.) may be used with exemplary embodiments of the invention. Although the foregoing examples show the various embodiments of the invention in one physical configuration; it is to be appreciated that the various components may be located at distant portions of a distributed network, such as a local area network, a wide area network, a telecommunications network, an intranet and/or the Internet. Thus, it should be appreciated that the components of the various embodiments may be combined into one or more devices, collocated on a particular node of a distributed network, or distributed at various locations in a network, for example. The components of the various embodiments may be arranged at any location or locations within a distributed network without affecting the operation of the respective system.

Data and information maintained by the servers and personal computers shown in FIG. 1 may be stored and cataloged in one or more databases, which may comprise or interface with a searchable database and/or a cloud database. The databases may comprise, include or interface to a relational database. Other databases, such as a query format database, a Standard Query Language (SQL) format database, a storage area network (SAN), or another similar data storage device, query format, platform or resource may be used. The databases may comprise a single database or a collection of databases. In some embodiments, the databases may comprise a file management system, program or application for storing and maintaining data and information used or generated by the various features and functions of the systems and methods described herein.

The communications network in FIG. 1, may be comprised of, or may interface to any one or more of, for example, the Internet, an intranet, a Local Area Network (LAN), a Wide Area Network (WAN), a Metropolitan Area Network (MAN), a storage area network (SAN), a frame relay connection, an Advanced Intelligent Network (AIN) connection, a synchronous optical network (SONET) connection, a digital T1, T3, E1 or E3 line, a Digital Data Service (DDS) connection, a Digital Subscriber Line (DSL) connection, an Ethernet connection, an Integrated Services Digital Network (ISDN) line, an Asynchronous Transfer Mode (ATM) connection, a Fiber Distributed Data Interface (FDDI) connection, a Copper Distributed Data Interface (CDDI) connection, or an optical/DWDM network.

The communications network in FIG. 1 may also comprise, include or interface to any one or more of a Wireless Application Protocol (WAP) link, a Wi-Fi link, a microwave link, a General Packet Radio Service (GPRS) link, a Global System for Mobile Communication (GSM) link, a Code Division Multiple Access (CDMA) link or a Time Division Multiple Access (TDMA) link such as a cellular phone channel, a Global Positioning System (GPS) link, a cellular digital packet data (CDPD) link, a Bluetooth radio link, or an IEEE 802.11-based radio frequency link. The communications network may further comprise, include or interface to any one or more of an RS-232 serial connection, an IEEE-1394 (Firewire) connection, a Fibre Channel connection, an infrared (IrDA) port, a Small Computer Systems Interface (SCSI) connection, a Universal Serial Bus (USB) connection or another wired or wireless, digital or analog interface or connection.

In some embodiments, the communication network may comprise a satellite communications network, such as a direct broadcast communication system (DBS) having the requisite number of dishes, satellites and transmitter/receiver boxes, for example. The communications network may also comprise a telephone communications network, such as the Public Switched Telephone Network (PSTN). In another embodiment, the communication network may comprise a Personal Branch Exchange (PBX), which may further connect to the PSTN.

Although examples of servers 130, 140, 150, 160 and personal computing devices 142 are shown in FIG. 1, exemplary embodiments of the invention may utilize other types of communication devices whereby a user may interact with a network that transmits and delivers data and information used by the various systems and methods described herein. The personal computing device 142 may include desktop computers, laptop computers, tablet computers, smart phones, and other mobile computing devices, for example. The servers and personal computing devices may include a microprocessor, a microcontroller or other device operating under programmed control. These devices may further include an electronic memory such as a random access memory (RAM), electronically programmable read only memory (EPROM), other computer chip-based memory, a hard drive, or other magnetic, electrical, optical or other media, and other associated components connected over an electronic bus, as will be appreciated by persons skilled in the art. The mobile device and personal computing device may be equipped with an integral or connectable liquid crystal display (LCD), electroluminescent display, a light emitting diode (LED), organic light emitting diode (OLED) or another display screen, panel or device for viewing and manipulating files, data and other resources, for instance using a graphical user interface (GUI) or a command line interface (CLI). The mobile device and personal computing device may also include a network-enabled appliance or another TCP/IP client or other device. The personal computing devices 142 may include various connections such as a cell phone connection, WiFi connection, Bluetooth connection, satellite network connection, and/or near field communication (NFC) connection, for example. Although FIG. 1 shows only one personal computing device 142, in practice other personal computing devices will typically be used to access, configure and maintain the operation of the various servers shown in FIG. 1.

As described above, FIG. 1 includes a number of servers and personal computing devices, each of which may include at least one programmed processor and at least one memory or storage device. The memory may store a set of instructions. The instructions may be either permanently or temporarily stored in the memory or memories of the processor. The set of instructions may include various instructions that perform a particular task or tasks, such as those tasks described above. Such a set of instructions for performing a particular task may be characterized as a program, software program, software application, app, or software. The modules described above may comprise software, firmware, hardware, or a combination of the foregoing.

It is appreciated that in order to practice the methods of the embodiments as described above, it is not necessary that the processors and/or the memories be physically located in the same geographical place. That is, each of the processors and the memories used in exemplary embodiments of the invention may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two or more pieces of equipment in two or more different physical locations. The two distinct pieces of equipment may be connected in any suitable manner. Additionally, the memory may include two or more portions of memory in two or more physical locations.

As described above, a set of instructions is used in the processing of various embodiments of the invention. The servers and personal computing devices in FIG. 1 may include software or computer programs stored in the memory (e.g., non-transitory computer readable medium containing program code instructions executed by the processor) for executing the methods described herein. The set of instructions may be in the form of a program or software or app. The software may be in the form of system software or application software, for example. The software might also be in the form of a collection of separate programs, a program module within a larger program, or a portion of a program module, for example. The software used might also include modular programming in the form of object oriented programming. The software tells the processor what to do with the data being processed.

Further, it is appreciated that the instructions or set of instructions used in the implementation and operation of the invention may be in a suitable form such that the processor may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processor, i.e., to a particular type of computer, for example. Any suitable programming language may be used in accordance with the various embodiments of the invention. For example, the programming language used may include assembly language, Ada, APL, Basic, C, C++, dBase, Forth, HTML, Android, iOS, .NET, Python, Java, Modula-2, Pascal, Prolog, REXX, Visual Basic, and/or JavaScript. Further, it is not necessary that a single type of instructions or single programming language be utilized in conjunction with the operation of the system and method of the invention. Rather, any number of different programming languages may be utilized as is necessary or desirable.

Also, the instructions and/or data used in the practice of various embodiments of the invention may utilize any compression or encryption technique or algorithm, as may be desired. An encryption module might be used to encrypt data. Further, files or other data may be decrypted using a suitable decryption module, for example.

The software, hardware and services described herein may be provided utilizing one or more cloud service models, such as Software-as-a-Service (SaaS), Platform-as-a-Service (PaaS), and Infrastructure-as-a-Service (IaaS), and/or using one or more deployment models such as public cloud, private cloud, hybrid cloud, and/or community cloud models.

In the system and method of exemplary embodiments of the invention, a variety of "user interfaces" may be utilized to allow a user to interface with the personal computing devices. As used herein, a user interface may include any hardware, software, or combination of hardware and software used by the processor that allows a user to interact with the processor of the communication device. A user interface may be in the form of a dialogue screen provided by an app, for example. A user interface may also include any of touch screen, keyboard, voice reader, voice recognizer, dialogue screen, menu box, list, checkbox, toggle switch, a pushbutton, a virtual environment (e.g., Virtual Machine (VM)/cloud), or any other device that allows a user to receive information regarding the operation of the processor as it processes a set of instructions and/or provide the processor with information. Accordingly, the user interface may be any system that provides communication between a user and a processor. The information provided by the user to the processor through the user interface may be in the form of a command, a selection of data, or some other input, for example.

Although the embodiments of the present invention have been described herein in the context of a particular implementation in a particular environment for a particular purpose, those skilled in the art will recognize that its usefulness is not limited thereto and that the embodiments of the present invention can be beneficially implemented in other related environments for similar purposes.

What is claimed is:

1. A computer-implemented method for providing a service-to-service authentication (SSA) service, the method comprising:
   deploying the SSA service comprising software on a server;
   deploying a first micro service comprising software on a web server, including authenticating a service deployer and generating both a unique service secret for a first micro service instance and a public-private key pair, wherein the unique service secret is associated with the public-private key pair, and the public-private key pair and the associated unique service secret are stored in a SSA backend datastore;
   configuring the first micro service, including providing a first micro service instance the service secret and a first micro service private key (PrSK);
   providing an SSA client comprising software that serves as an interface between the first micro service and the SSA service;
   receiving via the SSA client a request from the first micro service for an authentication token;
   generating, with the SSA service, the authentication token for the first micro service, wherein the authentication token is signed by the SSA service using an SSA service private key and the authentication token has a limited lifespan; and
   encrypting the authentication token and sending the encrypted authentication token from the SSA service to the first micro service;
   wherein the authentication token includes information necessary for the first micro service to access a second micro service directly through validation of the authentication token by the second micro service based at least in part on the first micro service private key previously generated by the SSA service.

2. The method of claim 1, wherein the authentication token comprises a JSON Web Token (JWT).

3. The method of claim 1, wherein the authentication token is valid if: (a) it is signed with the SSA service private key (PrSS), and (b) it is not expired.

4. The method of claim 3, wherein the authentication token is valid if, in addition, (c) it includes an internet protocol (IP) field that matches an IP address of the first micro service.

5. The method of claim 4, wherein the authentication token includes a service field, and the authentication token is valid if, in addition, (d) the service field matches a service name of the first micro service.

6. The method of claim 1, wherein calls between the first micro service and the SSA service are made using a remote procedure call (RPC) format that uses a protocol buffer to serialize structured data.

7. The method of claim 1, wherein the SSA service is designed to permit validation of an authentication token only if the authentication token was issued by the SSA service.

8. The method of claim 1, wherein the SSA service can be run in Kubernetes clusters and in virtual machines.

9. The method of claim 1, wherein during deployment of the first micro service, the service secret is generated by the SSA service for the micro service together with the private key and a public key.

10. A computer-implemented system for providing a service-to-service authentication (SSA) service, the system comprising:
    an electronic memory; and
    a computer processor that is programmed with software to execute the SSA service, including execution of the following functions:
       deploying a first micro service, including authenticating a service deployer and generating both a unique service secret for a first micro service instance and a public-private key pair, wherein the unique service secret is associated with the public-private key pair, and the public-private key pair and the associated unique service secret are stored in a SSA backend datastore;

configuring the first micro service, including providing a first micro service instance the service secret and a first micro service private key (PrSK);

providing an SSA client comprising software that serves as an interface between the first micro service and the SSA service;

receiving via the SSA client a request from the first micro service for an authentication token;

generating the authentication token for the first micro service, wherein the authentication token is signed using an SSA service private key (PrSS), and the authentication token has a limited lifespan; and encrypting the authentication token and sending the encrypted authentication token with a first micro service public key (PuSK) from the SSA service to the first micro service;

wherein the authentication token includes information necessary for the first micro service to access a second micro service directly through validation of the authentication token by the second micro service based at least in part on the first micro service private key.

11. The system of claim 10, wherein the computer processor is programmed to generate the authentication token as a JSON Web Token (JWT).

12. The system of claim 10, wherein the computer processor is programmed to sign the authentication token with the SSA service private key (PrSS), and to include an expiration date within the authentication token that is used by a second micro service to validate the authentication token.

13. The system of claim 12, wherein the computer processor is programmed to generate an internet protocol (IP) field as part of the authentication token that is used by the second micro service to validate the authentication token.

14. The system of claim 13, wherein the computer processor is programmed to generate a service field as part of the authentication token that is used by the second micro service to validate the authentication token.

15. The system of claim 10, wherein calls between the first micro service and the SSA service are made using a remote procedure call (RPC) format that uses a protocol buffer to serialize structured data.

16. The system of claim 10, wherein the SSA service is designed to permit validation of an authentication token only if the authentication token was issued by the SSA service.

17. The system of claim 10, wherein the SSA service can be run in Kubernetes clusters and in virtual machines.

18. The system of claim 10, wherein the computer processor is programmed to generate the service secret for the micro service together with the private key (PrSK) and a public key (PuSK) during deployment of the first micro service.

* * * * *